(12) United States Patent
Ladd

(10) Patent No.: US 7,538,304 B2
(45) Date of Patent: May 26, 2009

(54) REDUCING NOISE IN AN IMAGER BY SAMPLING SIGNALS WITH A PLURALITY OF CAPACITANCES CONNECTED TO AN OUTPUT LINE

(75) Inventor: John Ladd, Boise, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 15 days.

(21) Appl. No.: 11/392,792

(22) Filed: Mar. 30, 2006

(65) Prior Publication Data

US 2007/0235631 A1    Oct. 11, 2007

(51) Int. Cl.
  *C12Q 1/68*   (2006.01)
  *H01J 40/00*   (2006.01)
(52) U.S. Cl. ............... 250/200; 250/208.1; 250/214 R; 348/241
(58) Field of Classification Search ........... 348/241; 250/214 R, 208.1
  See application file for complete search history.

(56) References Cited

U.S. PATENT DOCUMENTS

| | | | |
|---|---|---|---|
| 6,040,570 A * | 3/2000 | Levine et al. ............ 250/208.1 |
| 6,078,037 A * | 6/2000 | Booth, Jr. ................ 250/208.1 |
| 6,140,630 A | 10/2000 | Rhodes |
| 6,204,524 B1 | 3/2001 | Rhodes |
| 6,211,914 B1 | 4/2001 | Kubo |
| 6,310,366 B1 | 10/2001 | Rhodes et al. |
| 6,326,652 B1 | 12/2001 | Rhodes |
| 6,333,205 B1 | 12/2001 | Rhodes |
| 6,376,868 B1 | 4/2002 | Rhodes |
| 6,657,665 B1 * | 12/2003 | Guidash ................... 348/308 |
| 6,885,396 B1 | 4/2005 | Panicacci |
| 7,057,147 B1 * | 6/2006 | Yu ........................... 250/208.1 |
| 7,135,665 B2 * | 11/2006 | Matsuda et al. .......... 250/208.1 |
| 2003/0076431 A1 | 4/2003 | Krymski |
| 2003/0206234 A1 * | 11/2003 | Sakurai et al. ............. 348/301 |
| 2005/0103977 A1 * | 5/2005 | Krymski .................. 250/208.1 |
| 2005/0110884 A1 | 5/2005 | Altice |
| 2005/0206752 A1 * | 9/2005 | Lim ........................... 348/241 |

\* cited by examiner

*Primary Examiner*—Seung C Sohn
(74) *Attorney, Agent, or Firm*—Dickstein Shapiro LLP

(57) ABSTRACT

A method of operating an imager to have increased capacitance on a pixel output or column output line during most reset signal and pixel signal sampling operations from the line. The increased capacitance is achieved by switching in multiple sample and hold capacitors during the sampling operations.

21 Claims, 10 Drawing Sheets

REDUCING NOISE IN AN IMAGER BY SAMPLING SIGNALS WITH A PLURALITY OF CAPACITANCES CONNECTED TO AN OUTPUT LINE

FIELD OF THE INVENTION

The invention relates generally to imaging devices and more particularly to a method of reducing temporal noise in an imaging device.

BACKGROUND

A CMOS imager circuit includes a focal plane array of pixel cells, each one of the cells including a photosensor, for example, a photogate, photoconductor or a photodiode overlying a substrate for accumulating photo-generated charge in the underlying portion of the substrate. Each pixel cell has a readout circuit that includes at least an output field effect transistor formed in the substrate and a charge storage region formed on the substrate connected to the gate of an output transistor. The charge storage region may be constructed as a floating diffusion region. Each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state before the transfer of charge to it; (4) transfer of charge to the storage region accompanied by charge amplification; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. Nos. 6,140,630, 6,376,868, 6,310,366, 6,326,652, 6,204,524 and 6,333,205, assigned to Micron Technology, Inc., which are hereby incorporated by reference in their entirety.

FIG. 1 illustrates a portion of a conventional CMOS imager 10. The illustrated imager 10 includes a pixel 20, one of many that are in a pixel array (not shown), connected to a column sample and hold circuit 40 by a pixel output line 32. The imager 10 also includes a readout programmable gain amplifier (PGA) 70 and an analog-to-digital converter (ADC) 80.

The illustrated pixel 20 includes a photosensor 22 (e.g., a pinned photodiode, photogate, etc.), transfer transistor 24, floating diffusion region FD, reset transistor 26, source follower transistor 28 and row select transistor 30. The photosensor 22 is connected to the floating diffusion region FD by the transfer transistor 24 when the transfer transistor 24 is activated by a transfer control signal TX. The reset transistor 26 is connected between the floating diffusion region FD and an array pixel supply voltage Vaa-pix. A reset control signal RST is used to activate the reset transistor 26, which resets the floating diffusion region FD (as is known in the art).

The source follower transistor 28 has its gate connected to the floating diffusion region FD and is connected between the array pixel supply voltage Vaa-pix and the row select transistor 30. The source follower transistor 28 converts the stored charge at the floating diffusion region FD into an electrical output voltage signal. The row select transistor 30 is controllable by a row select signal SELECT for selectively connecting the source follower transistor 28 and its output voltage signal to the pixel output line 32.

The column sample and hold circuit 40 includes a bias transistor 56, controlled by a control voltage Vln_bias, that is used to bias the pixel output line 32. The pixel output line 32 is also connected to a first capacitor 44 thru a sample and hold reset signal switch 42. The sample and hold reset signal switch 42 is controlled by the sample and hold reset control signal SHR. The pixel output line 32 is also connected to a second capacitor 54 thru a sample and hold pixel signal switch 52. The sample and hold pixel signal switch 52 is controlled by the sample and hold pixel control signal SHS. The switches 42, 52 are typically MOSFET transistors.

A second terminal of the first capacitor 44 is connected to the amplifier 70 via a first column select switch 50, which is controlled by a column select signal COLUMN_SELECT. The second terminal of the first capacitor 44 is also connected to a clamping voltage VCL via a first clamping switch 46. Similarly, the second terminal of the second capacitor 54 is connected to the amplifier 70 by a second column select switch 60, which is controlled by the column select signal COLUMN_SELECT. The second terminal of the second capacitor 54 is also connected to the clamping voltage VCL by a second clamping switch 48.

The clamping switches 46, 48 are controlled by a clamping control signal CLAMP. As is known in the art, the clamping voltage VCL is used to place a charge on the two capacitors 44, 54 when it is desired to store the reset and pixel signals, respectively (when the appropriate sample and hold control signals SHR, SHS are also generated).

Referring to FIGS. 1 and 2, in operation, the row select signal SELECT is driven high, which activates the row select transistor 30. When activated, the row select transistor 30 connects the source follower transistor 28 to the pixel output line 32. The clamping control signal CLAMP is then driven high to activate the clamping switches 46, 48, allowing the clamping voltage VCL to be applied to the second terminal of the sample and hold capacitors 44, 54. The reset signal RST is then pulsed to activate the reset transistor 26, which resets the floating diffusion region FD. The signal from the source follower 28 (based on the reset floating diffusion region FD) is then sampled when the sample and hold reset control signal SHR is pulsed. At this point, the first capacitor 44 stores the pixel reset signal $V_{rst}$.

Afterwards, the transfer transistor control signal TX is pulsed, causing charge from the photosensor 22 to be transferred to the floating diffusion region FD. The signal from the source follower 28 (based on the charge transferred to the floating diffusion region FD) is sampled when the sample and hold pixel control signal SHS is pulsed. At this point, the second capacitor 54 stores a pixel image signal $V_{sig}$. A differential signal ($V_{rst}-V_{sig}$) is produced by the differential amplifier 70. The differential signal is digitized by the analog-to-digital converter 80. The analog-to-digital converter 80 supplies the digitized pixel signals to an image processor (not shown), which forms a digital image output.

Pixel-wise temporal read noise is an important pixel performance parameter. A high read noise degrades the low light imaging performance of the image sensor due to a reduced signal-to-noise (SNR) ratio. For example, if a pixel has a read noise of about six electrons, the pixel must capture six photons to achieve a signal-to-noise ratio of one (excluding photon shot noise). If the read noise can be reduced, then the sensor can achieve the same signal-to-noise ratio at a reduced exposure, which will improve the low light performance of the image sensor.

Accordingly, there is a desire and need to mitigate the presence of noise, such as e.g., pixel-wise temporal read noise, in imagers.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

Figure 1:
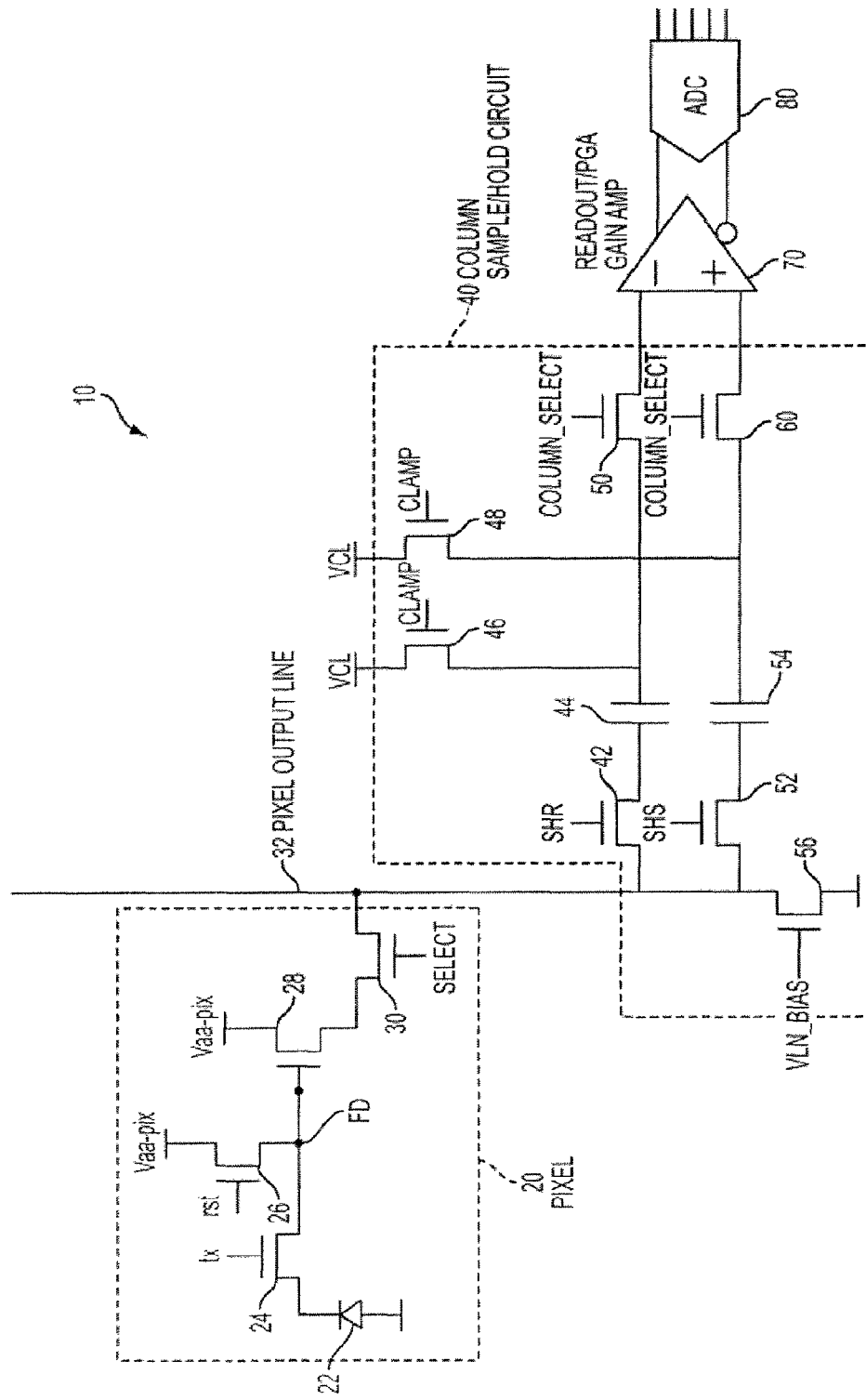
FIG. 1 is a diagram of a portion of a typical CMOS imager.
Figure 2:
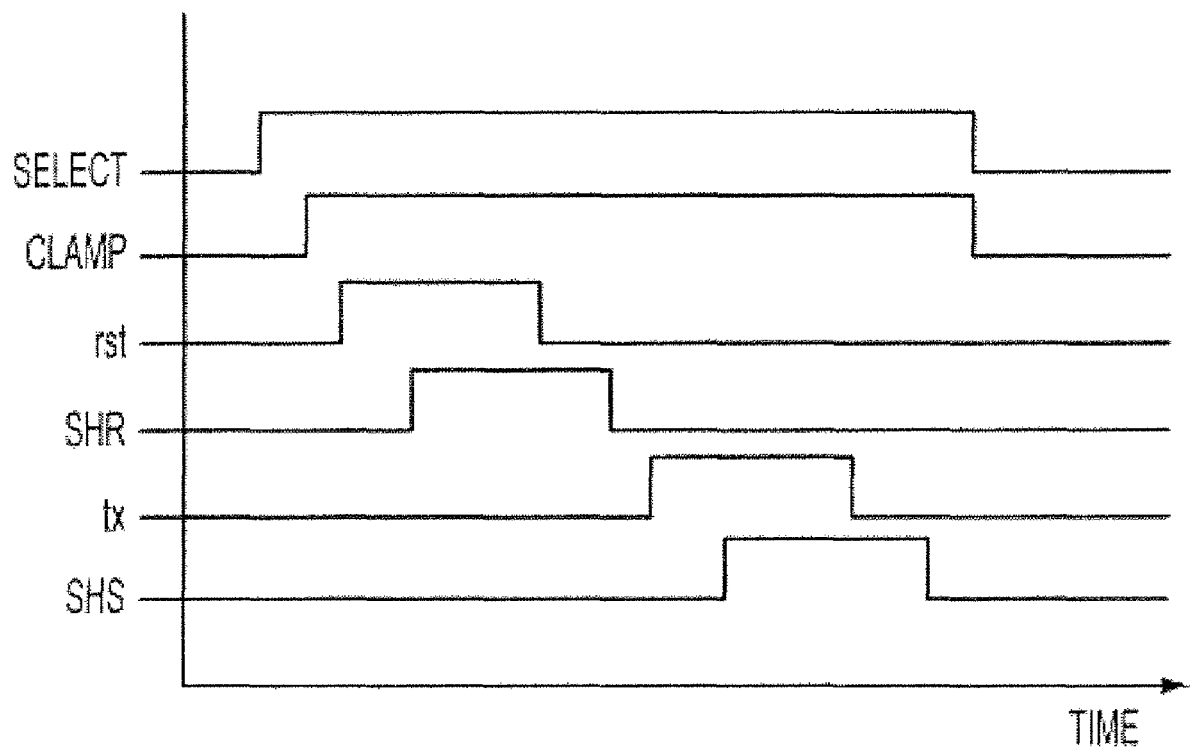
FIG. 2 is a timing diagram of the operation of the FIG. 1 imager.

There are many known sources of pixel-wise temporal noise. The 1/f and thermal noise associated with the source follower and the bias transistors are considered to be key contributors to the pixel-wise read noise problem. The inventors have determined that a dominant source of noise has a high frequency power spectrum (hereinafter referred to as "high frequency noise"). This type of high frequency noise is not reduced using conventional techniques such as correlated double sampling (CDS). The inventors have determined that it is possible to significantly reduce the noise associated with the high frequency power spectrum by adding an increased capacitive load to a column output (e.g., column output line) or the pixel output.

Referring again to FIG. 1, although there is some parasitic capacitance associated with the output of the source follower transistor 28, most of the capacitance seen by the output of the source follower transistor 28 during the sampling operations is a result of the sample and hold capacitors 44, 54 in the column sample and hold circuit 40. Thus, it is possible to reduce the high frequency noise on a column (i.e., the output of the source follower transistor 28) by increasing the size of the sample and hold capacitors 44, 54.

One drawback to this approach is that die area would also need to be increased to increase the size of the sample and hold capacitors 44, 54. In addition, the current flowing through the bias transistor 56 will need to be increased to charge the larger capacitors 44, 54 quickly enough to avoid adversely impacting the frame rate of the imager 10. Increasing the current through the bias transistor 56 will cause increased power consumption and may also reduce the gain of the source follower transistor 28 and may also effect anti-eclipse circuitry (not shown) often used in imagers.

Figure 3:
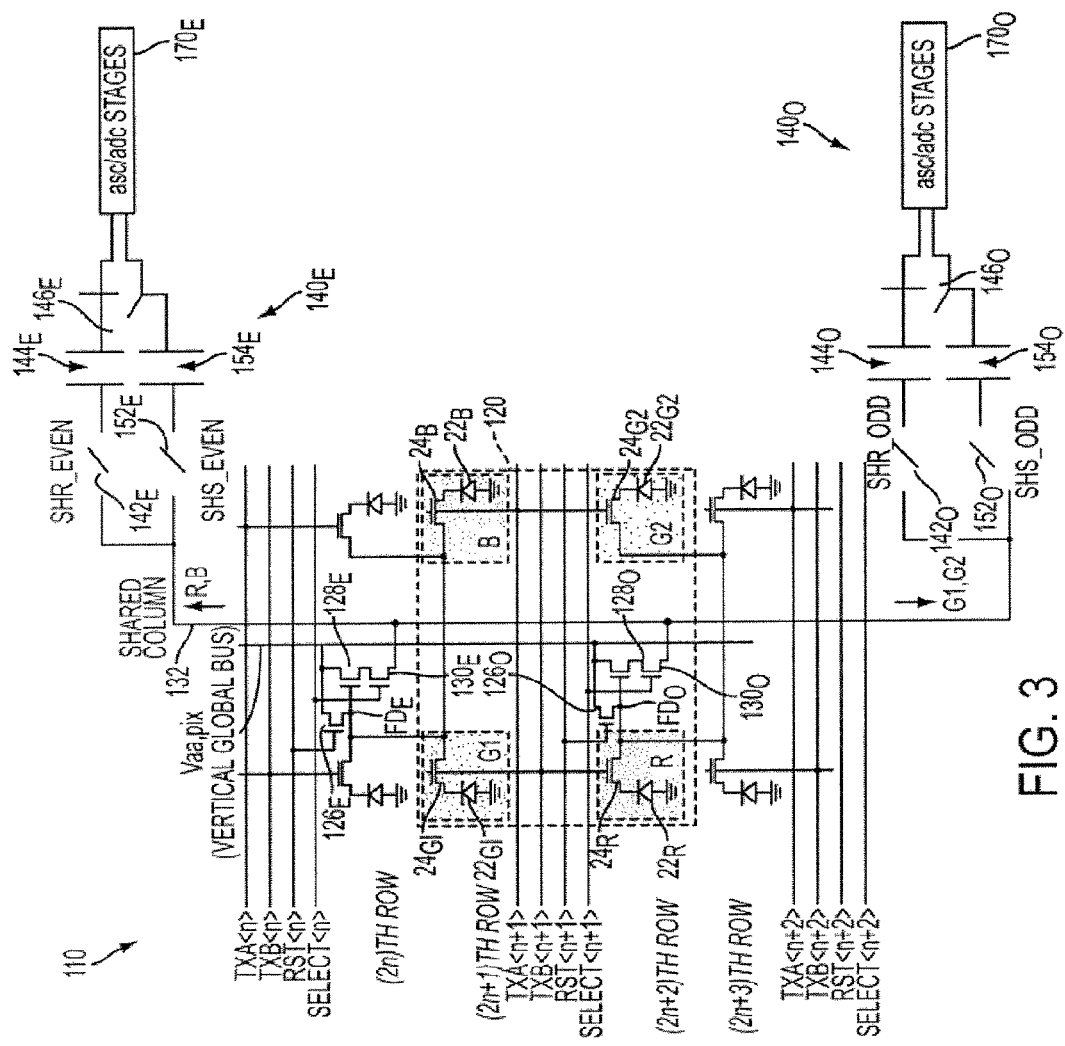
FIG. 3 is a diagram of a portion of a CMOS imager comprising 4-way shared pixels.

FIG. 3 shows of a portion of a CMOS imager 110 comprising 4-way shared pixels 120. The above-noted high frequency noise problem can be particularly troublesome to the FIG. 3 imager 110. As can be seen, the imager 110 includes a pixel 120 that contains four photosensors $22_{G1}$, $22_B$, $22_R$, $22_{G2}$ and transfer transistors $24_{G1}$, $24_B$, $24_R$, $24_{G2}$, arranged in a Bayer pattern to achieve two green G1, G2, a blue B and a red R pixel portions.

In the illustrated imager 110, the first green and blue pixel portions G1, B share a floating diffusion region $FD_E$, reset transistor $126_E$, source follower transistor $128_E$, and row select transistor $130_E$ with two other pixel portions in an even numbered row of the imager 110 pixel array. Similarly, the second green and red pixel portions G2, R share a floating diffusion region $FD_O$, reset transistor $126_O$, source follower transistor $128_O$, and row select transistor $130_O$ with two other pixel portions in an odd numbered row of the imager 110 pixel array.

A shared column output line 132 is connected to an even column sample and hold circuit 140E and an odd column sample and hold circuit 140O. The even sample and hold circuit 140E includes a first capacitor 144E, second capacitor 154E, sample and hold reset signal switch 142E, sample and hold pixel signal switch 152E and a clamping switch 146E. It should be appreciated that biasing and column select circuitry (such as those shown in FIG. 1) are also used, but not shown in FIG. 3. Sample and hold reset signal switch 142E is controlled by an even sample and hold reset control signal SHR_EVEN. Sample and hold pixel signal switch 152E is controlled by an even sample and hold pixel control signal SHS_EVEN. The clamping switch 146E is used to place a charge on the two capacitors 144E, 154E when it is desired to store the reset and pixel signals, respectively.

The odd sample and hold circuit $140_O$ includes a first capacitor $144_O$, second capacitor $154_O$, sample and hold reset signal switch $142_O$, sample and hold pixel signal switch $152_O$ and a clamping switch $146_O$. It should be appreciated that biasing and column select circuitry are also used, but not shown in FIG. 3. Sample and hold reset signal switch $142_O$ is controlled by an odd sample and hold reset control signal SHR_ODD. Sample and hold pixel signal switch $152_O$ is controlled by an odd sample and hold pixel control signal SHS_ODD. The clamping switch $146_O$ is used to place a charge on the two capacitors $144_O$, $154_O$ when it is desired to store the reset and pixel signals, respectively. The sample and hold circuits $140_E$, $140_O$ are connected to amplifier and analog-to-digital conversion stages $170_E$, $170_O$, which form a digital signal output from the differential signals ($V_{rst}$, $V_{sig}$) received from the sample and hold circuits $140_E$, $140_O$.

Figure 4:
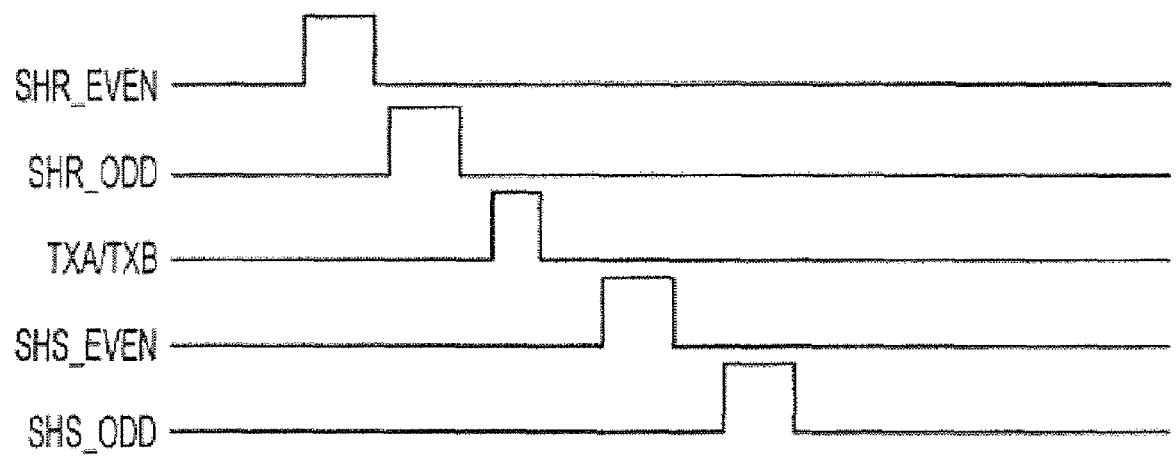
FIG. 4 is a timing diagram of a typical operation of the FIG. 3 imager.
Figure 4:
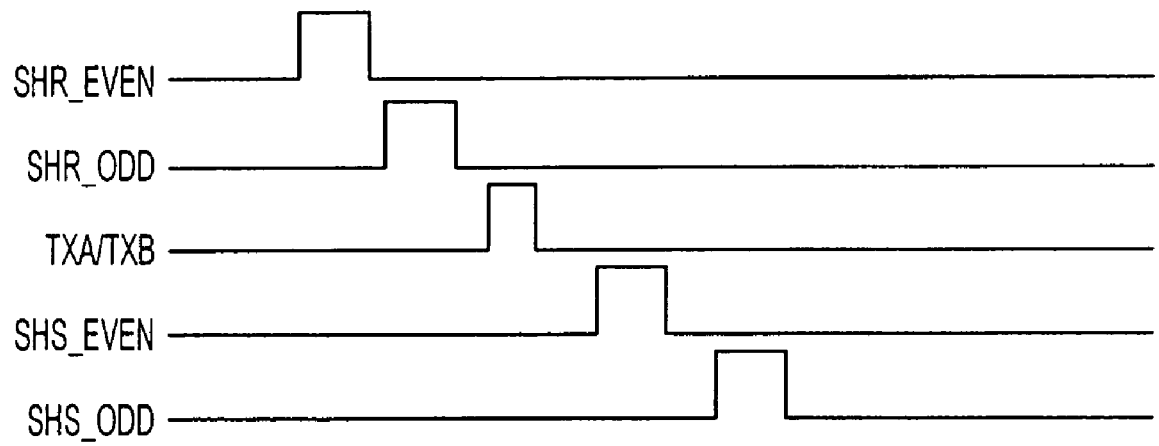

Referring to FIGS. 3 and 4, in operation, after the two floating diffusion regions $FD_E$, $FD_O$ associated with the pixel 120 have been reset by asserting the reset control signals RST<n>, RST<n+1>, the even sample and hold reset control signal SHR_EVEN is pulsed to store the reset signal value generated by source follower $128_E$ (based on the reset even floating diffusion region $FD_E$) in capacitor $144_E$ (via switch $142_E$). Then, the odd sample and hold reset control signal SHR_ODD is pulsed to store the reset signal value generated by source follower $128_O$ (based on the reset odd floating diffusion region $FD_O$) in capacitor $144_O$ (via switch $142_O$).

Afterwards, the first transfer gate control signal TXA<n+1> is pulsed to allow charges from the blue portion B to transfer (via transistor $24_B$) to the even floating diffusion region $FD_E$ and charges from the second green portion G2 to transfer (via transistor $24_{G2}$) to the odd floating diffusion region $FD_O$. The even sample and hold pixel control signal SHS_EVEN is pulsed to store the blue pixel signal value generated by source follower $128_E$ (based on the stored charge in the even floating diffusion region $FD_E$) into capacitor $154_E$ (via switch $152_E$). Then, the odd sample and hold pixel control signal SHS_ODD is pulsed to store the second green pixel signal value generated by source follower $128_O$ (based on the stored charge in the odd floating diffusion region $FD_O$) into capacitor $154_O$ (via switch $152_O$).

Although not shown in FIG. 4, the two floating diffusion regions $FD_E$, $FD_O$ are reset again by asserting the reset control signals RST<n>, RST<n+1>. The reset signals and the pixel signal values from the red and first green portion are then readout and sampled. The timing for the subsequent sampling of the reset signal values and the transfer and sampling of the red and first green pixel signal values follow the FIG. 4 timing diagram (except that TXB<n+1> is generated instead of TXA<n+1>). In a preferred operation of the FIG. 3 circuit, the first and second green pixel portions G1, G2 are routed to the same sample and hold circuit $140_O$ while the red and blue portions R,B are routed to sample and hold circuit $140_E$; thus forming a red/blue channel and a green channel. To accomplish this, another selection signal and additional sample and hold input switches (not shown) are used to route the signals to the desired sample and hold capacitors.

Figure 5:
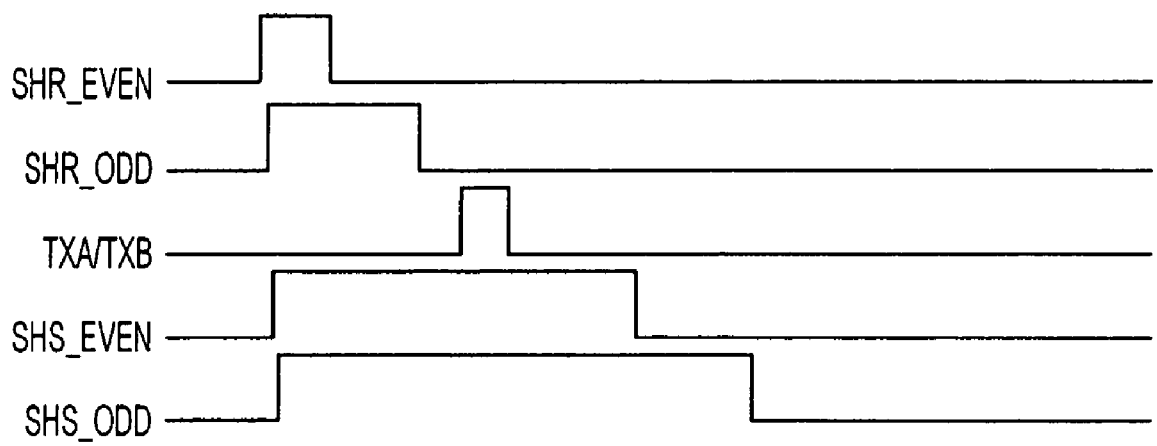
FIG. 5 is a timing diagram of an operation of the FIG. 3 imager according to an exemplary embodiment of the invention.

As mentioned above, imager 110 suffers from the high frequency noise problem. As also mentioned above, increasing the size of the capacitors $144_E$, $144_O$, $154_E$, $154_O$ could mitigate this problem, but is not a suitable solution. According to the present invention, however, the high frequency noise problem can be substantially mitigated without increasing capacitor size by operating the imager 110 in a different manner than the manner shown in FIG. 4. FIG. 5 illustrates an exemplary operating method in accordance with the present invention, which is designed to cause multiple sample and hold capacitors to be connected to the column output line during most of the sampling operations. Thus, the effective capacitance seen on the column output line is greatly increased without increasing die size or the size of the sample and hold capacitors (or adding other capacitors to the imager 110).

According to the exemplary embodiment of the invention, after the two floating diffusion regions $FD_E$, $FD_O$ have been reset by asserting the reset control signals RST<n>, RST<n+1>, all four sample and hold control signals are asserted at substantially the same time. That is, the even and odd sample and hold reset control signals SHR_EVEN, SHR_ODD and the even and odd sample and hold pixel control signals SHS_EVEN, SHS_ODD are activated at the same time. The activation of all four sample and hold control signals SHR_EVEN, SHR_ODD, SHS_EVEN, SHS_ODD activates transistors $142_E$, $142_O$, $152_E$, $152_O$, which connects all four sample and hold capacitors $144_E$, $144_O$, $154_E$, $154_O$ to the column output line 132 at the same time. Essentially, the capacitance of the capacitors $144_E$, $144_O$, $154_E$, $154_O$ are added together and applied to the column output line 132, which substantially mitigates high frequency noise.

A reset signal value from source follower $128_E$ (based on the reset even floating diffusion region $FD_E$) is stored in capacitor $144_E$ (via switch $142_E$). Afterwards, the even sample and hold reset control signal SHR_EVEN is de-asserted. This removes sample and hold capacitor $144_E$ from the shared column output line 132. A reset signal value from source follower $128_O$ (based on the reset odd floating diffusion region $FD_O$) is then stored in capacitor $144_O$ (via switch $142_O$). During this sampling, three sample and hold capacitors $144_O$, $154_E$, $154_O$ are connected to line 132. Subsequently, the odd sample and hold reset control signal SHR_ODD is de-asserted, which removes sample and hold capacitor $144_O$ from the line 132.

Afterwards, the first transfer gate control signal TXA<n+1> is pulsed to allow charges from the blue portion B to transfer (via transistor $24_B$) to the even floating diffusion region $FD_E$ and charges from the second green portion G2 to transfer (via transistor $24_{G2}$) to the odd floating diffusion region $FD_O$. It should be noted that at this time, the even and odd sample and hold pixel control signals SHS_EVEN, SHS_ODD are still maintained at a high level, which means that capacitors $154_E$, $154_O$ are still connected to the column line 132 (respectively via switches $152_E$, $152_O$). Once the charges from the even floating diffusion region $FD_E$ are transferred, the blue pixel signal value generated by source follower $128_E$ is stored in capacitor $154_E$. During this sampling, two sample and hold capacitors $154_E$, $154_O$ are connected to line 132.

The even sample and hold pixel control signal SHS_EVEN is then de-asserted, which removes sample and hold capacitor $154_E$ from the line 132. The second green pixel signal value from source follower $128_O$ (based on the transferred charge stored in the odd floating diffusion region $FD_O$) is stored in capacitor $154_O$ (via switch $152_O$). As such, the only time multiple capacitors are not connected to the column output line 132 is during the sampling of the odd pixel signal value (e.g., green pixel G2).

The inventors have determined that high frequency noise is greatly reduced and substantially mitigated by operating the imager 110 in accordance with the FIG. 5 timing diagram. Reducing the high frequency noise leads to improved readout and a vastly improved image output. The timing of FIG. 5 will increase the settling time of the column line 132 since it will take a longer time to charge the larger capacitance seen on the line during most of the operations. This is typically not a problem, however, because the imager 110 runs at a reduced frame rate (where pixel timing width can be increased without any effect on frame rate) for low light conditions. In bright light conditions, the pixel readout can revert to the timing illustrated in FIG. 4, since there is no need for improved read noise performance in bright light conditions (where photon shot noise is the dominant noise source).

Moreover, by optimizing the widths of the sample and hold control signals, the inventors determined that the settling time requirement is less than two-times the requirements of the FIG. 4 timing. This is because although there is a heavier capacitive load, the widths of the SHR_ODD, SHS_EVEN, and SHS_ODD signals are also increased, which allows their associated capacitors to begin charging sooner than they normally would using the FIG. 4 timing.

Figure 6:
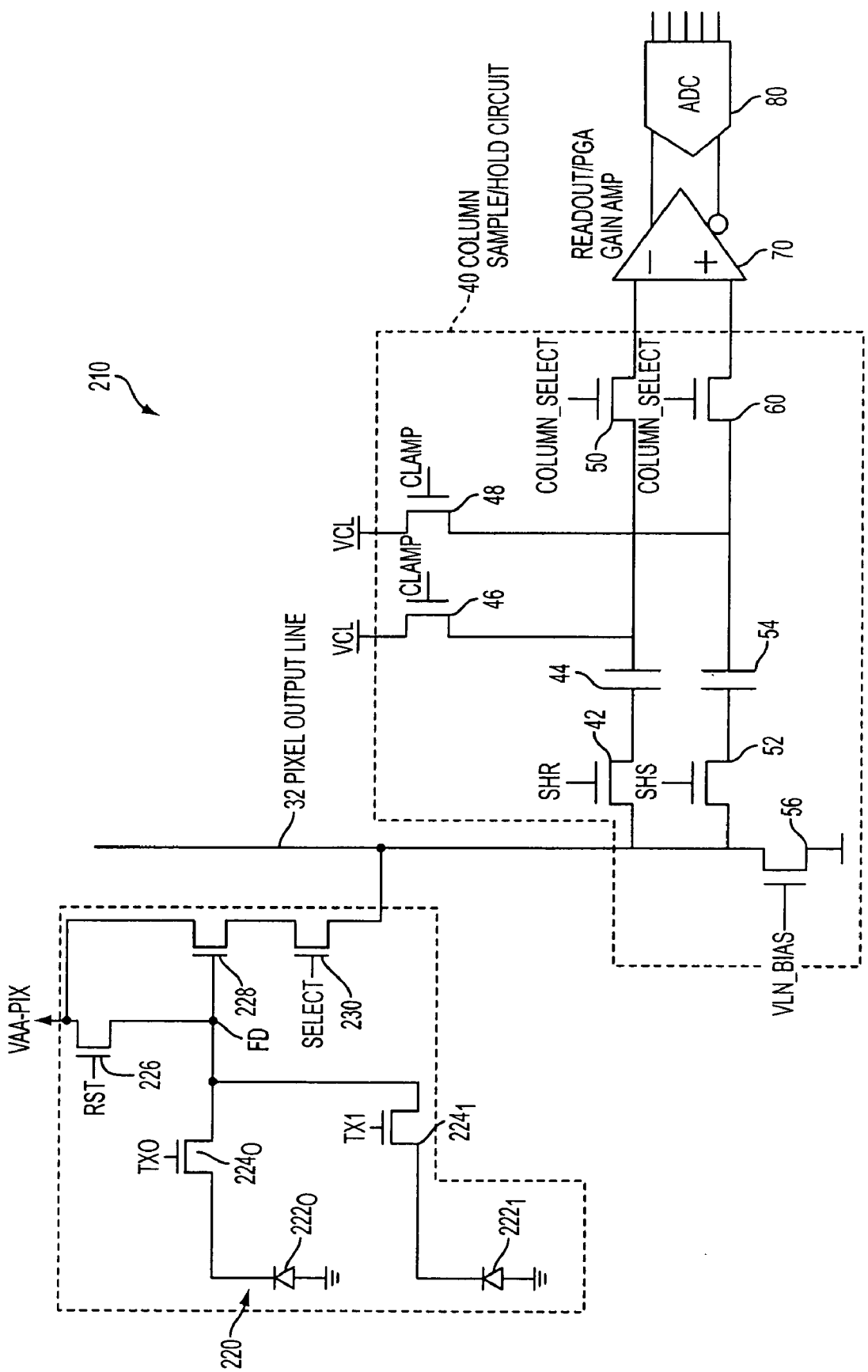
FIG. 6 is a diagram of a portion of a CMOS imager comprising 2-way shared pixels.

FIG. 6 is a diagram of a portion of a CMOS imager 210 comprising a 2-way shared pixel 220. That is, each pixel 220 comprises two photosensors $222_0$, $222_1$ and transfer transistors $224_0$, $224_1$. In the illustrated imager 210, the photosensors $222_0$, $222_1$, and transfer transistors $224_0$, $224_1$ share a floating diffusion region FD, reset transistor 226, source follower transistor 228, and row select transistor 230. A shared pixel output line 32 is connected to a column sample and hold circuit 40 (described above with reference to FIG. 1).

Figure 7:
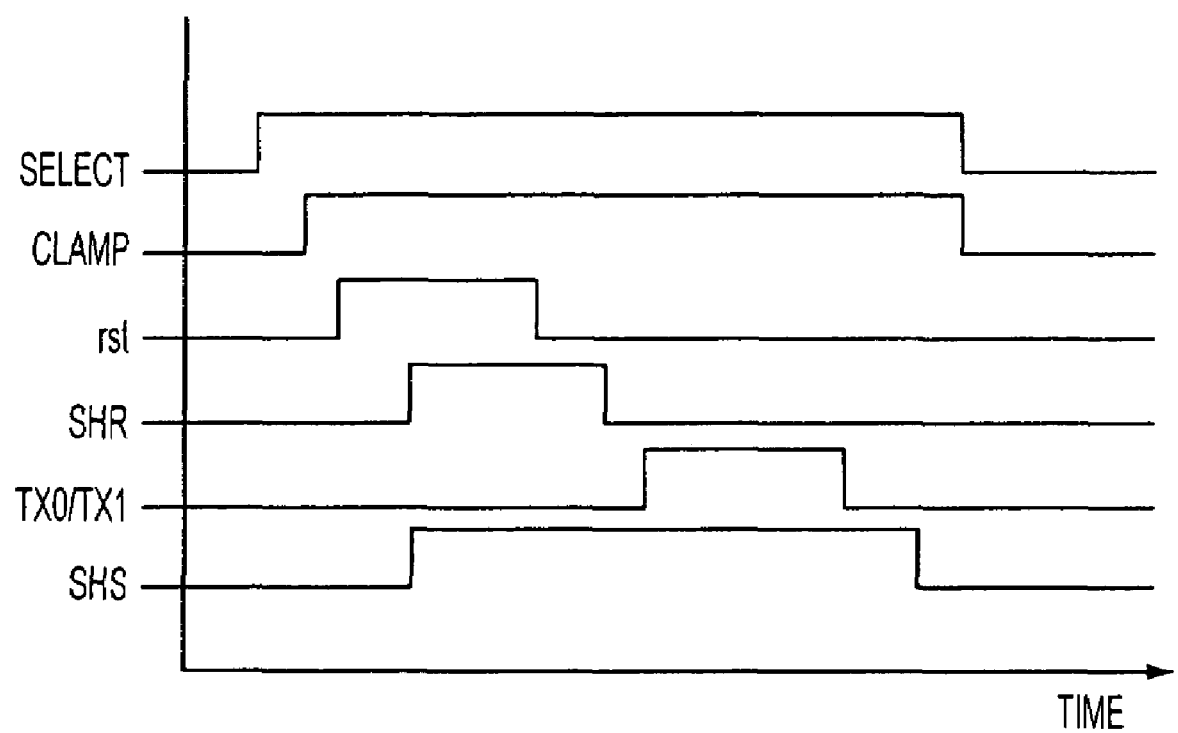
FIG. 7 is a timing diagram of an operation of the FIG. 6 imager according to an exemplary embodiment of the invention.

In order to reduce and/or substantially mitigate high frequency noise, the imager 210 is operated in accordance with the exemplary timing diagram illustrated in FIG. 7 to connect multiple sample and hold capacitors to line 32 during at least a portion of reset and pixel signal sample and hold operations.

Referring now to FIGS. 6 and 7, the row select signal SELECT is driven high, which activates the row select transistor 230. When activated, the row select transistor 230 connects the source follower transistor 228 to line 32. The clamping control signal CLAMP is then driven high to activate the clamping switches 46, 48, allowing the clamping voltage VCL to be applied to the second terminal of the sample and hold capacitors 44, 54. The reset signal RST is then pulsed to activate the reset transistor 226, which resets the floating diffusion region FD. Then, the sample and hold reset control signal SHR and the sample and hold pixel control signal SHS are activated at the same time. In doing so, the capacitances of both capacitors 44, 54 in the sample and hold circuit 40 are connected to line 32.

The signal on the floating diffusion region FD is converted to a reset signal $V_{rst}$ by the source follower 228 and then stored in the first capacitor 44. Once $V_{rst}$ is stored, the sample and hold reset control signal SHR is de-asserted, which removes (via open switch 42) capacitor 44 from line 32. Afterwards, the first transfer transistor control signal TX0 is pulsed, causing charge from the first photosensor $222_0$ to be transferred to the floating diffusion region FD. The pixel signal $V_{sig}$ from the source follower 228 (based on the transferred charge on the floating diffusion region FD) is then stored in the second capacitor 54. A differential signal ($V_{rst}$–$V_{sig}$) is produced by the differential amplifier 70. The differential signal is digitized by the analog-to-digital converter 80. The analog-to-digital converter 80 supplies the digitized pixel signals to an image processor (not shown), which forms a digital image output.

Although not shown in FIG. 6, the floating diffusion region FD is reset again by asserting the reset control signal RST. The reset signal $V_{rst}$ and the pixel signal $V_{sig}$ from the second photosensor $222_1$ are then readout and sampled using the same timing discussed above (except that TX1 is generated instead of TX0).

Figure 8:
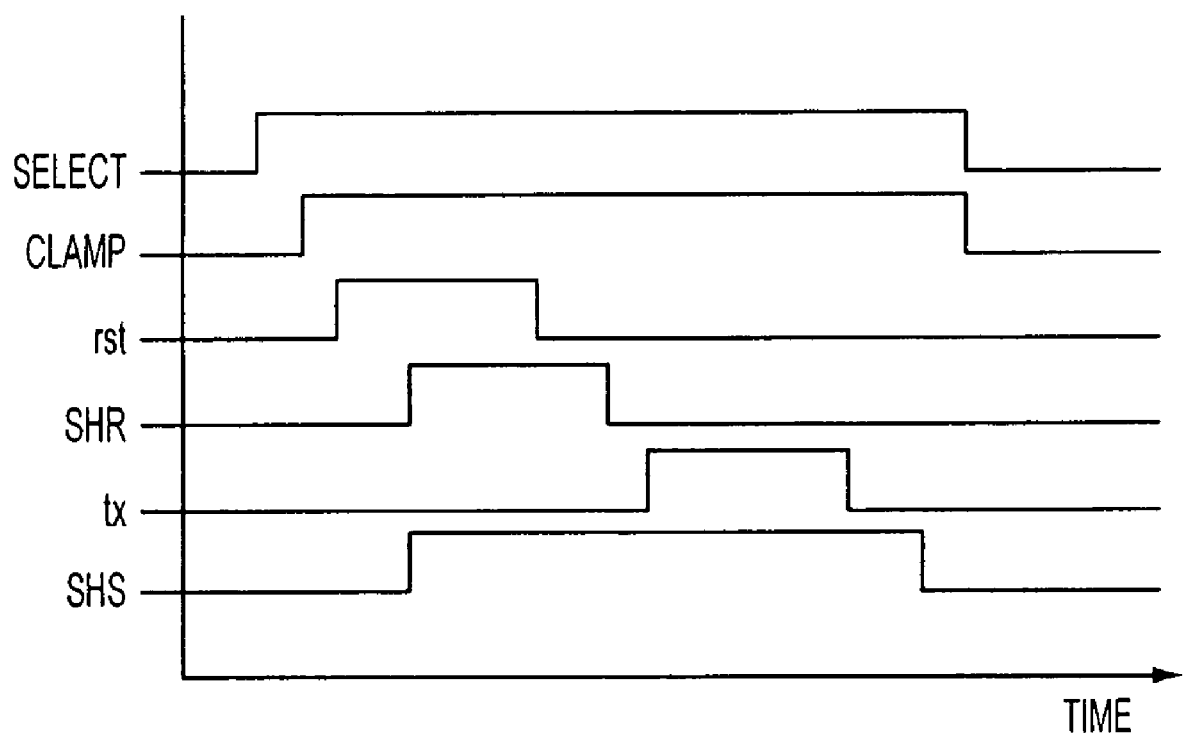
FIG. 8 is a timing diagram of an operation of the FIG. 1 imager according to an exemplary embodiment of the invention.

FIG. 8 is a timing diagram of an operation of the FIG. 1 imager 10 according to another exemplary embodiment of the invention. In order to reduce and/or substantially mitigate high frequency noise, the imager 10 is operated in accordance with the exemplary timing diagram illustrated in FIG. 8 to connect multiple sample and hold capacitors to line 32 during at least a portion of reset and pixel signal sample and hold operations.

Referring now to FIGS. 1 and 8, the row select signal SELECT is driven high, which activates the row select transistor 30. When activated, the row select transistor 30 connects the source follower transistor 28 to line 32. The clamping control signal CLAMP is then driven high to activate the clamping switches 46, 48, allowing the clamping voltage VCL to be applied to the second terminal of the sample and hold capacitors 44, 54. The reset signal RST is then pulsed to activate the reset transistor 26, which resets the floating diffusion region FD. Then, the sample and hold reset control signal SHR and the sample and hold pixel control signal SHS are activated at the same time. In doing so, the capacitances of both capacitors 44, 54 in the sample and hold circuit 40 are connected to line 32.

The signal on the floating diffusion region FD is converted to a reset signal $V_{rst}$ by the source follower 28 and then stored in the first capacitor 44. Once Vrst is stored, the sample and hold reset control signal SHR is de-asserted, which removes (via open switch 42) capacitor 44 from line 32. Afterwards, the transfer transistor control signal TX is pulsed, causing charge from the photosensor 22 to be transferred to the floating diffusion region FD. The pixel signal $V_{sig}$ from the source follower 28 (based on the transferred charge on the floating diffusion region FD) is then stored in the second capacitor 54. A differential signal ($V_{rst}$–$V_{sig}$) is produced by the differential amplifier 70. The differential signal is digitized by the analog-to-digital converter 80. The analog-to-digital converter 80 supplies the digitized pixel signals to an image processor (not shown), which forms a digital image output.

Figure 9:
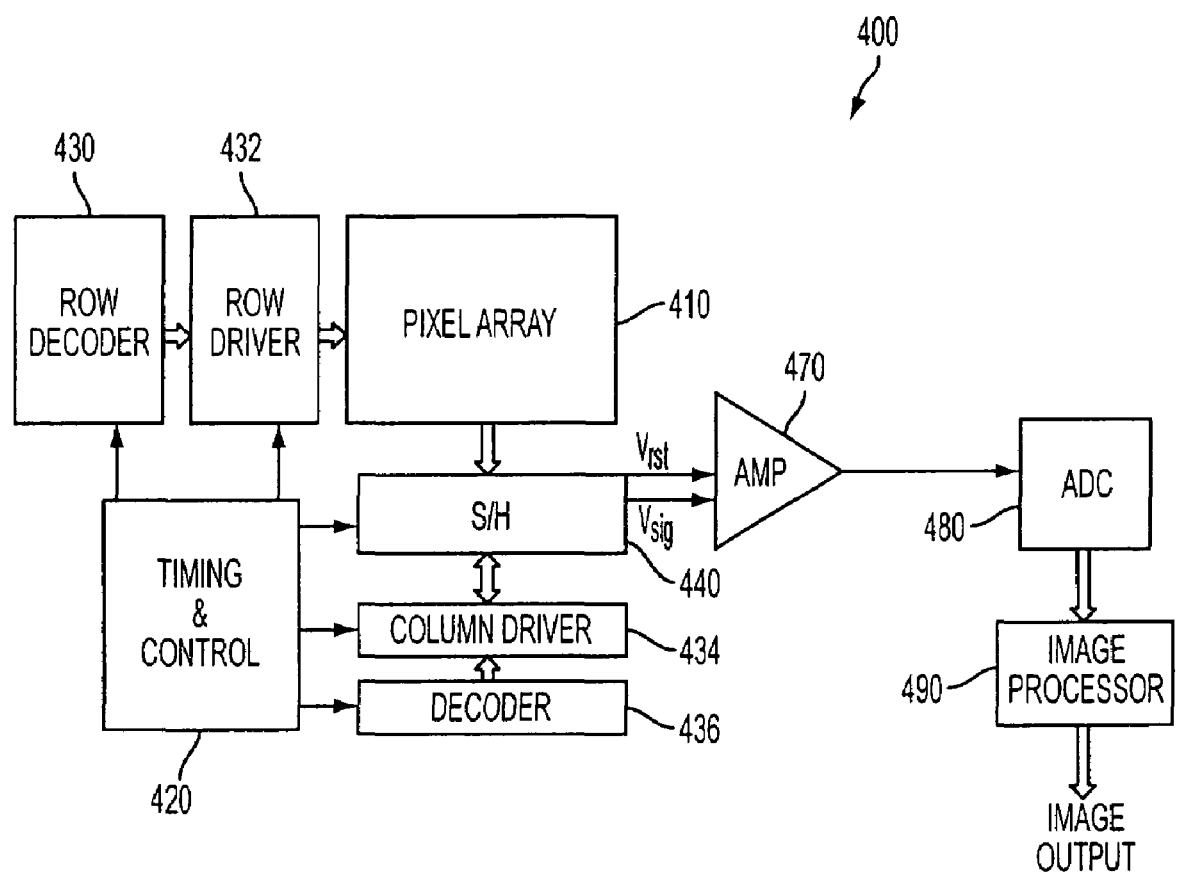
FIG. 9 illustrates an imager according to any exemplary embodiment of the invention.

FIG. 9 illustrates a block diagram for a more complete CMOS imager 400. The imager 400 includes a pixel array 410. The pixel array 410 comprises a plurality of pixels arranged in a predetermined number of columns and rows. The array 410 may utilize one of the pixel configurations illustrated in FIG. 1, 4 or 6. The pixels of each row in array 410 are all turned on at the same time by a row select line and the pixels of each column are selectively output by a column select line. A plurality of row and column lines are provided for the entire array 410.

The row lines are selectively activated by the row driver 432 in response to row address decoder 430 and the column select lines are selectively activated by the column driver 434 in response to column address decoder 436. Thus, a row and column address is provided for each pixel. The CMOS imager 400 is operated by the control circuit 420, which controls address decoders 430, 436 for selecting the appropriate row and column lines for pixel readout, and row and column driver circuitry 432, 434, which apply driving voltage to the drive transistors of the selected row and column lines.

Each column contains sample and hold circuitry 440 associated with the column driver 434 that reads a pixel reset signal $V_{rst}$ and a pixel image signal $V_{sig}$ for selected pixels. A differential signal ($V_{rst}$–$V_{sig}$) is produced by differential amplifier 470 for each pixel and is digitized by analog-to-digital converter 480 (ADC). The analog-to-digital converter 480 supplies the digitized pixel signals to an image processor 490, which forms a digital image output. In a preferred embodiment, the control circuit 420 operates the array 410 in accordance with the appropriate timing of the invention. As stated above, it is possible for the control circuit 420 to utilize the multiple capacitor sample and hold operations for low light conditions and use standard single capacitor sample and hold operations for bright light conditions, if desired.

Figure 10:
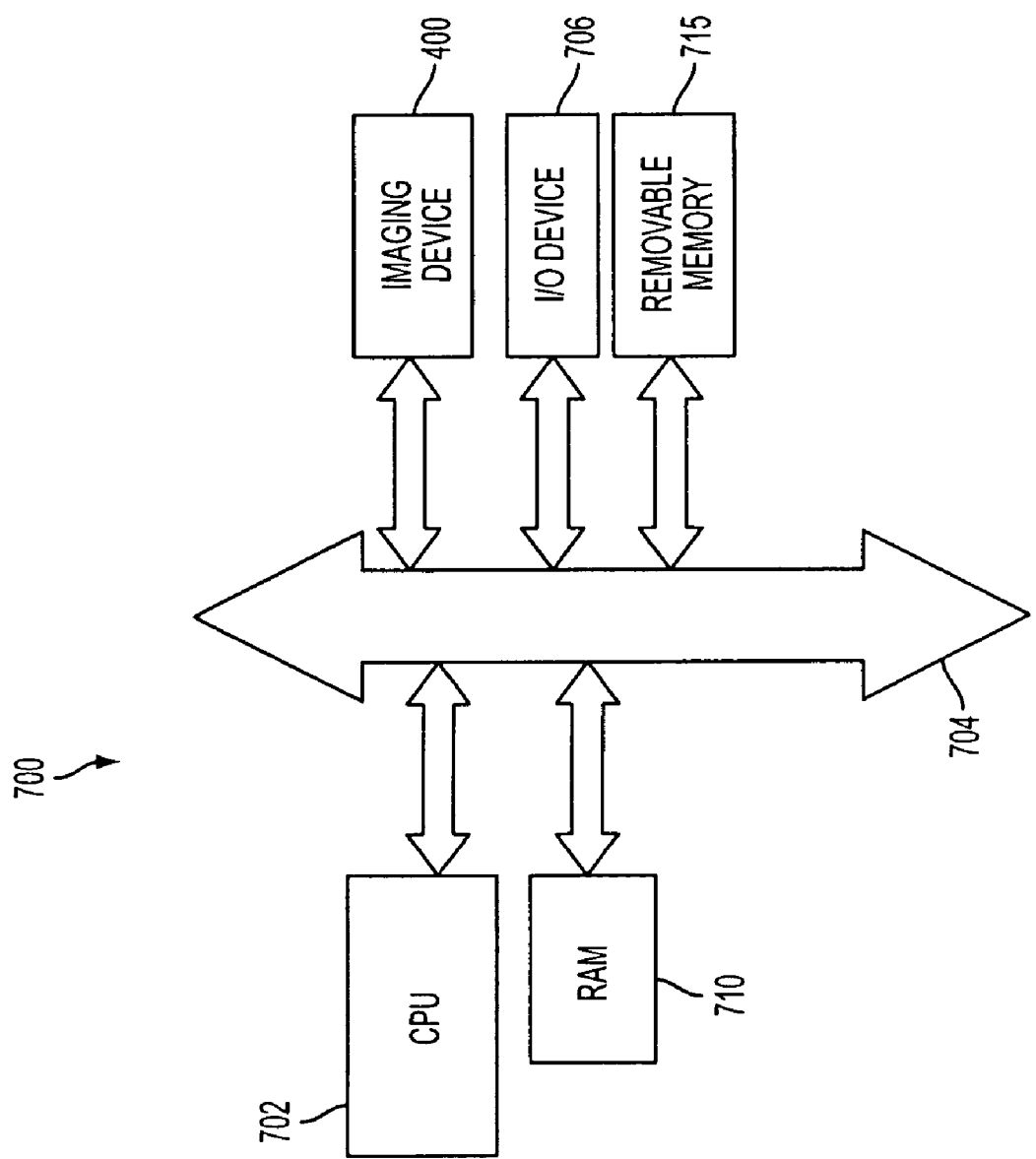
FIG. 10 shows a processor system incorporating at least one imaging device constructed in accordance with an embodiment of the invention.

FIG. 10 shows system 700, a typical processor system modified to include an imaging device 400 constructed and operated in accordance with an embodiment of the invention. The processor system 700 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 700, for example a camera system, generally comprises a central processing unit (CPU) 702, such as a microprocessor, that communicates with an input/output (I/O) device 706 over a bus 704. Imaging device 400 also communicates with the CPU 702 over the bus 704. The processor system 700 also includes random access memory (RAM) 710, and can include removable memory 715, such as flash memory, which also communicate with the CPU 702 over the bus 704. The imaging device 400 may be combined with a processor, such as a CPU, digital signal processor, or microprocessor, with or without memory storage on a single integrated circuit or on a different chip than the processor.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. A method of operating an imaging device, said method comprising the acts of:
    resetting a pixel floating diffusion region;
    electrically connecting a plurality of capacitances to a pixel output line simultaneously;
    sampling from the line a first signal from the reset floating diffusion region;
    removing only a first capacitance of the plurality of capacitances from the line;
    transferring charge from a first photosensitive device to the floating diffusion region; and
    sampling from the line a second signal from the floating diffusion region.

2. The method of claim 1, wherein the sampled first signal is stored in a first capacitor associated with the first capacitance.

3. The method of claim 2, wherein the sampled second signal is stored in a second capacitor associated with another of the plurality of capacitances.

4. The method of claim 1 further comprising the acts of:
    resetting the pixel floating diffusion region;
    electrically connecting the plurality of capacitances to the pixel output line simultaneously;
    sampling from the line a third signal from the reset floating diffusion region;
    removing the first capacitance of the plurality of capacitances from the line;
    transferring charge from a second photosensitive device to the floating diffusion region; and
    sampling from the line a fourth signal from the floating diffusion region.

5. The method of claim 4, wherein the sampled third signal is stored in the first capacitor.

6. The method of claim 5, wherein the sampled fourth signal is stored in the second capacitor.

7. A method of operating an imaging device, said method comprising the acts of:
    resetting first and second pixel floating diffusion regions;
    electrically connecting a plurality of capacitances simultaneously to a pixel output line electrically connected to the floating diffusion regions;
    sampling from the line a first signal from the reset first floating diffusion region;
    removing only a first capacitance of the plurality of capacitances from the line;
    sampling from the line a second signal from the reset second floating diffusion region;
    removing only a second capacitance of the plurality of capacitances from the line;
    transferring charge from a first photosensitive device to the first floating diffusion region;
    transferring charge from a second photosensitive device to the second floating diffusion region;
    sampling from the line a third signal from the first floating diffusion region;
    removing only a third capacitance of the plurality of capacitances from the line; and
    sampling from the line a fourth signal from the second floating diffusion region.

8. The method of claim 7, wherein the sampled first signal is stored in a first capacitor associated with the first capacitance.

9. The method of claim 8, wherein the sampled second signal is stored in a second capacitor associated with the second capacitance.

10. The method of claim 9, wherein the sampled third signal is stored in a third capacitor associated with the third capacitance.

11. The method of claim 10, wherein the sampled fourth signal is stored in a fourth capacitor associated with another of the plurality of capacitances.

12. The method of claim 7 further comprising the acts of:
    resetting the first and second pixel floating diffusion regions;
    electrically connecting the plurality of capacitances simultaneously to a pixel output line electrically connected to the floating diffusion regions;
    sampling from the line a fifth signal from the reset first floating diffusion region;
    removing the first capacitance from the line;
    sampling from the line a sixth signal from the reset second floating diffusion region;
    removing the second capacitance from the line;
    transferring charge from a third photosensitive device to the first floating diffusion region;
    transferring charge from a fourth photosensitive device to the second floating diffusion region;
    sampling from the line a seventh signal from the first floating diffusion region;
    removing the third capacitance from the line; and
    sampling from the line an eighth signal from the second floating diffusion region.

13. A method of operating an imaging device comprising the acts of:
    sampling a first signal from a column output line connected to a pixel circuit while a plurality of capacitors are simultaneously electrically connected to the line;
    removing only one of the plurality of capacitors used to store the sampled first signal from the line; and
    sampling a second signal from the line.

14. The method of claim 13, further comprising the acts of:
    removing only a second one of the plurality of capacitors used to store the sampled second signal from the line; and
    sampling a third signal from the line.

15. The method of claim 14, further comprising the acts of:
    removing only a third one of the plurality of capacitors used to store the sampled third signal from the line; and
    sampling a fourth signal from the line.

16. An imaging device comprising:
    a plurality of pixels organized into rows and columns;
    sample and hold circuitry connected to the columns via column output lines; and
    a control circuit for controlling the sample and hold circuit to sample a first signal from a first column output line while a plurality of capacitors are simultaneously electrically connected to the line, remove only one of the plurality of capacitors used to store the sampled first signal from the line and sample a second signal from the line.

17. The device of claim 16, wherein said control circuit further controls the sample and hold circuit to remove a second one of the plurality of capacitors from the line, and sample a third signal from the line.

18. The device of claim 17, wherein said control circuit further controls the sample and hold circuit to remove a third one of the plurality of capacitors from the line, and sample a fourth signal from the line.

19. A processor system comprising:
a processor; and
an imaging device coupled to said processor, said imaging device comprising a plurality of pixels organized into rows and columns, sample and hold circuitry connected to the columns via column output lines, and a control circuit for controlling the sample and hold circuit to sample a first signal from a first column output line while a plurality of capacitors are simultaneously electrically connected to the line, remove only one of the plurality of capacitors from the line and sample a second signal from the line.

20. The system of claim 19, wherein said control circuit further controls the sample and hold circuit to remove a second one of the plurality of capacitors from the line, and sample a third signal from the line.

21. The system of claim 20, wherein said control circuit further controls the sample and hold circuit to remove a third one of the plurality of capacitors from the line, and sample a fourth signal from the line.

* * * * *